United States Patent
Lee et al.

(10) Patent No.: US 12,252,816 B2
(45) Date of Patent: Mar. 18, 2025

(54) TIRE CORD, MANUFACTURING METHOD THEREOF AND TIRE COMPRISING SAME

(71) Applicant: KOLON INDUSTRIES, INC., Seoul (KR)

(72) Inventors: Sung Gyu Lee, Seoul (KR); Ok Hwa Jeon, Seoul (KR); Min-ho Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 354 days.

(21) Appl. No.: 17/769,769

(22) PCT Filed: Dec. 21, 2020

(86) PCT No.: PCT/KR2020/018740
§ 371 (c)(1),
(2) Date: Apr. 18, 2022

(87) PCT Pub. No.: WO2021/133005
PCT Pub. Date: Jul. 1, 2021

(65) Prior Publication Data
US 2022/0372672 A1   Nov. 24, 2022

(30) Foreign Application Priority Data

Dec. 26, 2019  (KR) .................. 10-2019-0175655
Dec. 16, 2020  (KR) .................. 10-2020-0176538

(51) Int. Cl.
*D02G 3/48*    (2006.01)
*B60C 9/00*    (2006.01)
*D06M 15/693*  (2006.01)

(52) U.S. Cl.
CPC ............. *D02G 3/48* (2013.01); *B60C 9/0042* (2013.01); *D06M 15/693* (2013.01)

(58) Field of Classification Search
None
See application file for complete search history.

(56) References Cited

U.S. PATENT DOCUMENTS

| | | | |
|---|---|---|---|
| 5,849,121 A | 12/1998 | Reuter | |
| 6,415,840 B1 | 7/2002 | Nishikawa | |
| 7,413,779 B2 | 8/2008 | Gorman | |
| 8,291,953 B2 | 10/2012 | Huyghe | |
| 2002/0122938 A1* | 9/2002 | Fisher | C08J 5/06 428/375 |
| 2004/0203304 A1* | 10/2004 | Almonacil | B60C 15/06 152/526 |
| 2005/0003141 A1* | 1/2005 | Zafiroglu | B32B 38/0004 428/92 |
| 2008/0020203 A1* | 1/2008 | Tabata | C09J 7/29 428/355 R |
| 2010/0108231 A1 | 5/2010 | Lamontia | |
| 2013/0061997 A1 | 3/2013 | Cinget | |
| 2015/0020944 A1* | 1/2015 | Till | B60C 15/0036 152/542 |
| 2015/0314644 A1* | 11/2015 | Grassi | C09J 109/10 152/542 |
| 2019/0275837 A1 | 9/2019 | Pöhler | |

FOREIGN PATENT DOCUMENTS

| | | | |
|---|---|---|---|
| CN | 107848331 A | 3/2018 | |
| JP | 2020-525344 A | 8/2020 | |
| KR | 2007-0046572 A | 5/2007 | |
| KR | 20110001499 A | 1/2011 | |
| KR | 2011-0026558 A | 3/2011 | |
| KR | 10-20110081315 A | 7/2011 | |
| KR | 101327704 B1 | 11/2013 | |
| KR | 1020160106678 A | 9/2016 | |
| KR | 1020190003205 A | 1/2019 | |
| KR | 102005184 A | 10/2019 | |
| WO | WO-2013048384 A1 * | 4/2013 | ............. B29D 30/38 |
| WO | 2015-159795 A1 | 4/2017 | |
| WO | 2019004666 A1 | 1/2019 | |
| WO | 2019-138906 A1 | 7/2019 | |

OTHER PUBLICATIONS

International Search Report dated Apr. 1, 2021.

* cited by examiner

*Primary Examiner* — Tamra L. Dicus
(74) *Attorney, Agent, or Firm* — Harvest IP Law, LLP

(57) ABSTRACT

The present invention relates to a tire cord having excellent durability while being thin in thickness, a manufacturing method thereof and a tire comprising the same.

14 Claims, No Drawings

TIRE CORD, MANUFACTURING METHOD THEREOF AND TIRE COMPRISING SAME

CROSS-REFERENCE TO RELATED APPLICATION(S)

This application is a National Stage of International Application No. PCT/KR2020/018740 on Dec. 21, 2020 claiming the benefit of Korean Patent Application No. 10-2019-0175655 filed on Dec. 26, 2019 and Korean Patent Application No. 10-2020-0176538 filed on Dec. 16, 2020 with the Korean Intellectual Property Office, the disclosures of which are incorporated herein by reference in their entirety.

TECHNICAL FIELD

Technical Field

The present invention relates to a tire cord, a manufacturing method thereof and a tire comprising the same.

Background Art

Recently, as the vehicle performance and road condition are improved, the driving speed is getting higher. Thus, it is necessary to maintain the stability and durability of the tire even during a high speed driving. For this purpose, lots of studies are actively conduced about a tire cord to be used as a reinforcement for a tire rubber.

A tire cord may be broadly classified into carcass, belt, and cap ply, depending on used part and rule. Materials used therefor include nylon, rayon, aramids, and polyesters including PET.

At this time, the tire cord composed of the above materials is generally rolled together with rubber component for adhesion to rubber. That is, a rolling process is involved in the tire manufacturing process. By the way, when the rolling process for the adhesion of a tire cord and rubber is applied in the tire manufacturing process, process costs increase, and the density of the tire increases more than necessary due to the rolling, thereby unnecessarily increasing the weight of the tire.

Additionally, in the process of rolling rubber on tire cords, solid rubber is generally used. The product formed by the rolling of such a solid state rubber is difficult to make into a thin film of 200 μm or less, particularly 5 μm to 30 μm. When these products are used as reinforcements, the thickness and weight of tires increase.

On the other hand, recently, tire manufacturers have attempted to reduce the thickness of the rubber layer in order to make ultra-lightweight of the tire and reduce the weight of the reinforcement material. Rolling Resistance (R/R) is related to the weight of the tire, and has a significant impact on the fuel consumption and carbon dioxide emissions of a vehicle. For example, the larger the rolling resistance (R/R), the higher the energy required for driving the vehicle. In addition, the resistance to rotation, tilting and acceleration of the vehicle is closely related to the weight of the vehicle. Consequently, research is also underway to reduce the weight of the vehicle through reduction of the tire weight, thereby reducing the energy consumption.

Therefore, there is a need to develop a novel tire cord exhibiting excellent adhesion to rubber while being thin in thickness.

DETAILED DESCRIPTION OF THE INVENTION

Technical Problem

It is an object of the present invention to provide a tire cord having excellent durability while being thin in thickness.

It is another object of the present invention to provide a manufacturing method of a tire cord having excellent durability while being thin in thickness.

It is yet another object of the present invention to provide a tire comprising the same.

Technical Solution

Provided herein is a tire cord comprising: a fiber substrate that is woven with a density between warp yarns of 65% or more, or a number of warp yarns per unit length (n/inch) of 35 or more using a warp yarn containing at least one of nylon, rayon, aramid, and polyester including PET; an adhesive layer formed on the fiber substrate; and a rubber coating layer formed on the adhesive layer, wherein the rubber coating layer comprises synthetic rubber or natural rubber, and wherein the application amount per unit area of the rubber coating layer to the adhesive layer is 75 to 300 $g/m^2$.

Also provided herein is a method for manufacturing a tire cord, comprising the steps of: preparing a fiber substrate that is woven with a density between warp yarns of 65% or more, or a number of warp yarns per unit length (n/inch) of 35 or more using a warp yarn containing at least one of nylon, rayon, aramid, and polyester including PET; forming an adhesive layer on the fiber substrate; and applying a rubber coating solution onto the adhesive layer and performing a heat treatment to form a rubber coating layer, wherein the rubber coating layer comprises synthetic rubber or natural rubber, and wherein the application amount per unit area of the rubber coating layer to the adhesive layer is 75 to 300 $g/m^2$.

Further provided herein is a tire comprising the above-mentioned tire cord.

Now, a tire cord, a manufacturing method thereof and a tire comprising the same according to specific embodiments of the present invention will be described in detail.

As used herein, the terms "warp yarn" and "weft yarn" refer to a configuration used for crossing these yarns with each other to weave a fiber substrate, which is a component of a tire cord. The orientation of each yarn associated with the crossing may be relative to each other, and thus the weft yarn and the warp yarn may also be names relative to each other.

The technical terms used herein are only for reference to specific embodiments and is not intended to limit the present invention. The singular forms "a", "an", and "the" used herein include plural references unless the context clearly indicates otherwise. It will be further understood that the terms "comprise", "include", "have", etc. as used herein specify the presence of stated features, integers, steps, constitutional elements, and/or combinations thereof but do not preclude the presence or addition of one or more other features, integers, steps, constitutional element, and/or combinations thereof.

The present invention can include a variety of modifications and can be embodied in many different forms, particular embodiments of which will be now provided and described in detail. However, it is not intended to limit the present invention to specific disclosed forms, and it should be construed that all modifications, equivalents, or substitutions can be made to the invention without departing from the technical sprit and scope of the invention.

In one embodiment, the present invention relates to a tire cord.

Specifically, according to one embodiment of the present invention, there can be provided a tire cord comprising: a fiber substrate that is woven with a density between warp yarns of 65% or more, or a number of warp yarns per unit length (n/inch) of 35 or more using a warp yarn containing at least one of nylon, rayon, aramid, and polyester including PET; an adhesive layer formed on the fiber substrate; and a rubber coating layer formed on the adhesive layer, wherein the rubber coating layer comprises synthetic rubber or natural rubber, and wherein the application amount per unit area of the rubber coating layer to the adhesive layer is 75 to 300 $g/m^2$.

The present inventors have conducted research on the tire cord, and confirmed through experiments that the tire cord including the above-mentioned components has excellent durability while being thin in thickness, thereby completing the invention.

Further, since the tire cord of the above embodiment has excellent adhesion to rubber, it can be strongly bonded to rubber without going through the rolling process in the tire manufacturing process. Without going through the rolling process, the manufacturing cost of the tire is reduced, the density of the tire is prevented from being increased more than necessary due to rolling, and the weight of the tire is prevented from being unnecessarily increased When the tire cord of the above embodiment is used as a tire cap ply, a belt, a carcass, and the like, the rolling process can be omitted and thus, the tire manufacturing process can be simplified, and the tire thickness and overall weight can be reduced. In addition, since the tackiness of the tire cord is greatly increased, air pockets are reduced during manufacturing of the green tire, thereby reducing the tire defect rate.

Further, when the tire cord of the above embodiment is used for a tire, due to the tire cord having excellent rubber reinforcement performance while being thin in thickness, the tire weight is reduced and rolling resistance (R/R) is lowered, which not only improves the fuel efficiency of the vehicle but also can lower the carbon dioxide emission amount.

The tire cord of the embodiment includes a fiber substrate, and the fiber substrate may use a filament including at least one of nylon, rayon, aramid, and polyester including PET as a warp yarn. At this time, weaving is performed using the warp yarn, wherein the weaving can be performed with a density between warp yarns of 65% or more or the number of warp yarns per unit length (n/inch) of 35 or more.

The density between the warp yarns represents the area occupied by warp yarn per inch, and specifically, it can be expressed as {(width of one strand of warp yarn (inch)× number of warp yarns per inch (n))/inch}×100(%). The width may be used in the same sense as the breadth, and in the case of a tire cord, the cross section thereof is substantially circular and thus, the width may be used interchangeably with the thickness.

In one illustrative example, the lower limit of the density between warp yarns may be 65% or more, 70% or more, 75% or more, 80% or more, 85% or more, 90% or more, or 95% or more. And, the upper limit of the density between warp yarns is not particularly limited, but for example, it may be less than 100%, specifically 99% or less, 98% or less, 97% or less, 96% or less, or 95% or less. When the range of density between warp yarns satisfies the above range, it is possible to form a stable adhesive layer and secure fatigue performance, and perform the role of improving the bonding strength with the rubber coating layer. In particular, when the density between warp yarns is less than 65%, there is a problem that the adhesive strength is unstable and the rubber coating layer flows down.

In one illustrative example, the number of warp yarns per unit length (n/inch) may be 35 or more, 40 or more, 45 or more, 50 or more, 55 or more, 60 or more, or 65 or more. And, the upper limit of the number of warp yarns per unit area is not particularly limited, but for example, it may be 90 or less, 85 or less, 80 or less, 75 or less, 70 or less, 65 or less, or 60 or less. When the number of warp yarns per unit area satisfies the above range, it is possible to form a stable adhesive layer, secure fatigue performance, and perform the role of improving bonding strength with the rubber coating layer. In particular, when the number of warp yarns per unit length is less than 35, there is a problem that the adhesive strength is unstable and the rubber coating layer flows down.

In one illustrative example, the fiber substrate may be a fiber substrate that is woven with a density between warp yarns of 65% or more, and simultaneously, a number of warp yarns per unit length (n/inch) of 35 or more. When the density between warp yarns and the number of warp yarns are simultaneously satisfied, the above-mentioned adhesive strength, bonding strength, and fatigue resistance performance can be secured more stably. The specific density between warp yarns and the number of yarn yarns are the same as described above.

In one illustrative example, the fiber substrate may have a density between weft yarns that is lower than the density between warp yarns. Similarly to the density between warp yarns described above, the density between weft yarns represents the area occupied by the weft yarns per inch, and specifically, it can be confirmed as {(width of one strand of weft yarn (inch)×number of weft yarns per inch (n))/inch}× 100(%).

In one illustrative example, the fiber substrate may have a weft density in the range of 3 to 25%. Specifically, the lower limit of the weft density of the fiber substrate may be, for example, 4% or more, 5% or more, 6% or more, 7% or more, 8% or more, 9% or more, 10% or more, 11% or more, 12% or more, 13% or more, 14% or more, or 15% or more. And, the upper limit of the weft density of the fiber substrate may be, for example, 24% or less, 23% or less, 22% or less, 21% or less, 20% or less, 19% or less, 18% or less, 17% or less, 16% or less, 15% or less, 14% or less, 13% or less, 12% or less, 11% or less, or 10% or less. When the weft density is less than the above range, the warp yarn cannot be stably held during the heat treatment or rubber coating process and thus, the woven fabric is twisted and defects may occur. And, when the weft density exceeds the above range, it becomes difficult to adjust the width of the product during heat treatment, and the adhesive strength may become relatively low. The reason why the adhesive strength becomes low is because in the tire manufacturing, the weft yarn serves to hold the warp yarn and at the same time functions as a passage for the gas in the rubber to escape, but when excessive weft yarn is used, it functions as foreign materials in the interior of the tire to that extent, and the area where the warp yarn comes into contact with the rubber is reduced.

In one illustrative example, the fiber substrate may have the number of weft yarns per unit length (n/inch) that is lower than the number of weft yarns per unit length.

In one illustrative example, the fiber substrate may have a number of weft yarns in the range of 5 to 30 (number of weft yarns per unit length: n/inch). Specifically, the lower limit of the number of weft yarns of the fiber substrate may be, for example, 6 or more, 7 or more, 8 or more, 9 or more, 10 or more, 11 or more, 12 or more, 13 or more, 14 or more, 15 or more, 16 or more, 17 or more, 18 or more, 19 or more, or 20 or more. And, the upper limit of the number of weft yarns of the fiber substrate may be, for example, 29 or less, 28 or less, 27 or less, 26 or less, 25 or less, 24 or less, 23 or less, 22 or less, 21 or less, 20 or less, 19 or less, 18 or less, 17 or less, 16 or less, or 15 or less. When the number of weft yarns is less than the above range, the warp yarn cannot be stably held during the heat treatment or rubber coating process and thus, the woven fabric is twisted and defects may occur. And, when the number of the weft yarns exceeds the above range, it becomes difficult to adjust the width of the product during heat treatment, and the adhesive strength may become relatively low. The reason why the adhesive strength becomes low is because in the tire manufacturing, the weft yarn serves to hold the warp yarn and at the same time functions as a passage for the gas in the rubber to escape, but when excessive weft yarn is used, it functions as foreign materials in the interior of the tire to that extent, and the area where the warp yarn comes into contact with the rubber is reduced.

On the other hand, the warp yarn may be imparted a twist.

At this time, the twist unit is TPM and is defined as twist per meter, and the degree of twist can be twisted from 0 to a maximum of 250 TPM based on the number of twists per 1 m.

When twist is imparted to the warp yarn, it can have a role of improving the bundling property of the tire cord and improving the fatigue performance.

In one illustrative example, the fibers (warp yarn and/or weft yarn) including at least one of nylon, rayon, aramid, and polyester including PET may have a fineness of 300 to 1500 de. Specifically, the lower limit of the fineness may be 350 de or more, 400 de or more, 450 de or more, 500 de or more, 550 de or more, 600 de or more, 650 de or more, 700 de or more, 750 de or more, 800 de or more, 850 de or more, 900 de or more, 950 de or more, 1000 de or more, 1050 de or more, 1100 de or more, 1150 de or more, or 1200 de or more. And, the upper limit of the fineness may be, for example, 1450 de or less, 1400 de or less, 1350 de or less, 1300 de or less, 1250 de or less, 1200 de or less, 1150 de or less, 1100 de or less, 1050 de or less, 1000 de or less, 950 de or less, 900 de or less, 850 de or less, 800 de or less, 750 de or less, or 700 de or less.

For example, a warp yarn in which a twist of 0 to 250 TPM is imparted to a filament including at least one of rayon, aramid and polyester including PET having a fineness of 300 to 1500 de may be used.

Meanwhile, the fiber substrate of the embodiment may have a thickness of, for example, 0.10 mm or more, 0.15 mm or more, 0.20 mm or more, 0.25 mm or more, 0.30 mm or more, 0.35 mm or more, or 0.40 mm or more. And, the upper limit of the thickness may be, for example, 0.60 mm or less, 0.55 mm or less, 0.50 mm or less, 0.45 mm or less, or 0.40 mm or less. When the fiber substrate has a thickness in the above range, it is possible to form a stable adhesive layer having constant strength and elongation at break.

Meanwhile, the tire cord of the embodiment may include an adhesive layer formed on the above-mentioned fiber substrate.

The adhesive layer may include resorcinol-formaldehyde-latex (RFL). For example, the adhesive layer may be formed by an adhesive coating solution containing resorcinol-formaldehyde-latex (RFL) and a solvent.

The resorcinol-formaldehyde-latex is also known as "RFL" and may function as an adhesive component. Resorcinol-formaldehyde-latex can particularly improve the affinity and adhesive strength between the fiber substrate and the rubber component, and improve the adhesive strength between the fiber substrate and the rubber coating layer in the tire cord.

Consequently, the fiber substrate and the rubber coating layer in the tire cord can be stably attached without being separated from each other. When the above tire code applies to a tire, it is possible to prevent the occurrence of defects in the manufacturing process of tires. In addition, after the vulcanizing process, the tire cord and the rubber (e.g., tread, etc.) can be adhered together in the completed tire to maintain excellent adhesion strength.

Meanwhile, the tire cord of the embodiment may include a rubber coating layer formed on the adhesive layer.

At this time, the rubber coating layer may be formed by applying a rubber coating solution to the adhesive layer, but may have a thin rubber coating layer that is difficult to achieve through a rolling process using solid state rubber. As the thickness of the rubber coating layer becomes thinner, it can also contribute to the weight reduction of a tire cord including the same and a tire including the tire cord.

Specifically, the rubber coating layer may be formed by a rubber coating solution containing an elastomeric polymer composition containing synthetic rubber or natural rubber and a solvent, and the elastomeric polymer composition may include an elastomeric polymer and an additive.

For example, the elastomeric polymer composition may include at least one elastomeric polymer selected from natural rubber (NR), styrene butadiene rubber (SBR), butadiene rubber (BR), chloroprene rubber (CR), isobutylene rubber (IBR), isoprene rubber (IR), nitrile rubber (NBR), butyl rubber and neoprene rubber.

Further, the additives may include, for example, carbon black, paraoil, zinc oxide, stearic acid, anti-aging agents, sulfur, vulcanization accelerators, active agents, cohesive agents, adhesive agents and the like.

The type of the solvent is not particularly limited as long as it is a substance capable of dissolving the elastomeric polymer. For example, the solvent may include at least one selected from toluene, naphtha, methanol, xylene and tetrahydrofuran.

Meanwhile, the rubber coating solution may include 10 to 30% by weight of the elastomeric polymer composition; and 70 to 90% by weight of the solvent.

When the concentration of the elastomeric polymer composition in the rubber coating solution is less than 10% by weight, the thickness of the rubber coating layer becomes thin, and the tackiness and adhesive strength may not be properly expressed. This causes problems such as a decrease in tire manufacture characteristics and a tire defect during driving.

Meanwhile, when the concentration of the elastomeric polymer composition in the rubber coating solution exceeds 30% by weight, the stirring property is lowered due to an increase in viscosity, and the dispersibility of the rubber coating solution is lowered, whereby the coating property is lowered and the coating thickness can be non-uniform.

Meanwhile, the application amount per unit area of the rubber coating layer to the adhesive layer may be 75 to 300 $g/m^2$, but when the application amount per unit area of the rubber coating layer to the adhesive layer is adjusted within the above range, it is possible to provide a tire cord having excellent adhesiveness to rubber and excellent durability while being thin in thickness. Specifically, the lower limit of the application amount per unit area of the rubber coating layer to the adhesive layer may be, for example, 80 g/m$^2$ or more, 85 g/m$^2$ or more, 90 g/m$^2$ or more, 95 g/m$^2$ or more, 100 g/m$^2$ or more, 105 g/m$^2$ or more, 110 g/m$^2$ or more, 115 g/m$^2$ or more, 120 g/m$^2$ or more, 125 g/m$^2$ or more, 130 g/m$^2$ or more, 135 g/m$^2$ or more, 140 g/m$^2$ or more, 145 g/m$^2$ or more, 150 g/m$^2$ or more, 155 g/m$^2$ or more, 160 g/m$^2$ or more, 165 g/m$^2$ or more, 170 g/m$^2$ or more, 175 g/m$^2$ or more, 180 g/m$^2$ or more, 185 g/m$^2$ or more, 190 g/m$^2$ or more, 195 g/m$^2$ or more, or 200 g/m$^2$ or more. And, the upper limit of the application amount of the rubber coating layer may be, for example, 290 g/m$^2$ or less, 280 g/m$^2$ or less, 270 g/m$^2$ or less, 260 g/m$^2$ or less, 250 g/m$^2$ or less, 240 g/m$^2$ or less, 230 g/m$^2$ or less, 220 g/m$^2$ or less, 210 g/m$^2$ or less, 200 g/m$^2$ or less, 190 g/m$^2$ or less, 180 g/m$^2$ or less, 170 g/m$^2$ or less, or 160 g/m$^2$ or less.

When the rubber application amount per area of the rubber coating layer to the adhesive layer is less than the above range, voids may be generated on the rubber surface, or problems such as deterioration of tire quality may occur when manufacturing a tire using the above tire cord. And, when the application amount exceeds the above range, the tire weight increases and the rolling resistance (R/R) increases, whereby not only the fuel efficiency of the vehicle decreases, but also the carbon dioxide emission may increase.

Meanwhile, the rubber coating layer may have a thickness of 0.01 to 0.20 mm, or 0.02 to 0.20 mm, or 0.04 to 0.10 mm.

The conventional tire cord generally has a thickness of 1 mm or more, and a thickness of at least 0.8 mm or more, since a rubber substrate is rolled on a fiber substrate to form a rubber layer.

Meanwhile, since the rubber coating layer of the above embodiment is formed by the rubber coating solution, it may have a thin thickness of 0.2 mm or less. Consequently, the overall thickness of the tire cord may become thin and further, the thickness of the tire including the tire cord may become thin.

When the thickness of the rubber coating layer is less than 0.01 mm, the rubber coating layer does not have sufficient tackiness and adhesive strength, whereby when the tire cord is applied to a tire, the tire manufacture characteristics are deteriorated, it becomes difficult to express durability of the tire, and tire defects may occur.

When the thickness of the rubber coating layer exceeds 0.20 mm, the thickness of the tire cord is increased and thus the thickness of the tire may be increased. In particular, bubbles are generated in the rubber coating layer in the process of the volatilization of the solvent, which makes it difficult for the tire cord to have a uniform thickness. When this is applied to a tire, an air pocket occurs in the tire, which results in a decrease in the tire quality and an increase of the defective rate. In addition, there is a disadvantage in that it is necessary to perform the coating operation several times in order to form a thick rubber coating layer, which is inefficient in the process and may result in a decrease in tire quality and a defective rate.

Meanwhile, the tire cord may have a breaking tenacity of 2.0 to 15.0 g/d, or 8.0 to 13.0 g/d as measured according to the standard test method of ASTM D885.

Further, the tire cord may have an elongation at break of 10 to 30%, or 20 to 25% as measured according to the standard test method of ASTM D885.

Further, the tire cord may have an adhesive strength of 10 kgf or more or 15 kgf or more when evaluating the adhesion strength according to the standard test method of ASTM D4393.

In one illustrative example, the tire cord may have a 1-ply structure. That is, the tire cord may be a tire cord manufactured by imparting twist to one strand of the above-mentioned yarn. In the case of a 1-ply structure, it is advantageous to secure a thin thickness of the tire cord and reduce the weight. Further, it is advantageous to satisfy the warp and weft yarn-related density and number mentioned above.

In another example, the present invention relates to a method for manufacturing a tire cord.

Specifically, according to another embodiment of the present invention, there can be provided a method for manufacturing a tire cord, comprising the steps of: preparing a fiber substrate that is woven with a density between warp yarns of 65% or more, or a number of warp yarns per unit length (n/inch) of 35 or more using a warp yarn containing at least one of nylon, rayon, aramid, and polyester including PET; forming an adhesive layer on the fiber substrate; and applying a rubber coating solution onto the adhesive layer and performing a heat treatment to form a rubber coating layer, wherein the rubber coating layer comprises synthetic rubber or natural rubber, and wherein the coating amount per unit area of the rubber coating layer to the adhesive layer is 75 to 300 g/m$^2$.

The contents of the fiber substrate include the contents described above with respect to one embodiment.

Meanwhile, before the step of preparing a fiber substrate using the warp yarn, the step of imparting twist to a warp yarn containing at least one of nylon, rayon, aramid, and polyester including PET can be further included.

The degree of twist can be twisted from 0 to a maximum of 250 TPM based on the number of twists per 1 m.

As described above, in regard to the twist of the fiber, the manufacturing method of the present invention may be to prepare a 1-ply structure by imparting twist to one strand of the yarn.

Meanwhile, the adhesive layer may be formed on the fiber substrate, and the adhesive layer may be formed by an adhesive coating solution containing resorcinol-formaldehyde-latex (RFL) and a solvent. At this time, the step of forming the adhesive layer may include applying an adhesive coating solution onto the fiber substrate and performing a heat treatment.

The method of applying the adhesive coating solution onto the fiber substrate is not particularly limited. For example, the adhesive coating solution may be applied onto the fiber substrates by dipping the fiber substrate in the adhesive coating solution. Alternatively, a dipping process may be performed by passing the fiber substrate through the adhesive coating solution. The dipping process may be performed with a dipping machine in which tension, dipping time and temperature can be adjusted.

Further, the adhesive coating solution may be applied onto the fiber substrate by either coating using a blade or a coater or spraying using an injector, in addition to the dipping process.

Meanwhile, the step of forming the adhesive layer may further include a step of applying an adhesive coating solution onto the fiber substrate and performing a heat treatment at 130 to 250° C. for 80 to 120 seconds. At this time, the heat treatment may be performed with a heat treatment apparatus. The resorcinol-formaldehyde-latex (RFL) is cured and fixed by the heat treatment to complete the adhesive layer. By this heat treatment, the adhesive layer can be more stably formed.

Meanwhile, after the adhesive layer is formed, a rubber coating solution can be applied onto the adhesive layer and heat treated to form the rubber coating layer on the adhesive layer.

The rubber coating solution includes an elastomeric polymer composition and a solvent. The elastomeric polymer composition may include an elastomeric polymer and an additive.

For example, the elastomeric polymer composition may include at least one elastomeric polymer selected from natural rubber (NR), styrene butadiene rubber (SBR), butadiene rubber (BR), chloroprene rubber (CR), isobutylene rubber (IBR), isoprene rubber (IR), nitrile rubber (NBR), butyl rubber and neoprene rubber.

Further, the additives may include, for example, carbon black, paraoil, zinc oxide, stearic acid, anti-aging agents, sulfur, vulcanization accelerators, active agents, cohesive agents, adhesive agents and the like.

The type of the solvent is not particularly limited as long as it is a substance capable of dissolving the elastomeric polymer. For example, the solvent may include at least one selected from toluene, naphtha, methanol, xylene and tetrahydrofuran.

Meanwhile, the rubber coating solution includes 10 to 30% by weight of the elastomeric polymer composition and 70 to 90% by weight of the solvent based on the total weight of the rubber coating solution.

When the concentration of the elastomeric polymer composition in the rubber coating solution is less than 10% by weight, the thickness of the rubber coating layer becomes thin, and the tackiness and adhesive strength may not be properly expressed. This causes problems such as a decrease in tire manufacture characteristics and a tire defect during driving.

Meanwhile, when the concentration of the elastomeric polymer composition in the rubber coating solution exceeds 30% by weight, the stirring property is lowered due to an increase in viscosity, and the dispersibility of the rubber coating solution is lowered, whereby the coating property is lowered and the coating thickness can be non-uniform.

Meanwhile, a method of applying the rubber coating solution on the adhesive layer is not particularly limited, and a known coating method may be used.

For example, in order to form the rubber coating layer, the fiber substrate coated with the adhesive layer may be dipped in the rubber coating solution. By this dipping, a rubber coating solution may be applied onto the adhesive layer.

The coating method includes a gravure coating method, a micro gravure coating method, a comma coating, and the like. For example, the rubber coating solution may be applied onto the adhesive layer by comma coating using a comma coater. At this time, the coating may be performed at a temperature condition of 65 to 100° C., and this temperature corresponds to the lowest temperature at which the solvent can be volatilized.

Meanwhile, a step of applying a rubber coating solution onto the adhesive layer and then performing heat treatment can be further included.

At this time, the heat treatment may be performed by a heat treatment apparatus. For the heat treatment, heat may be applied for 30 to 150 seconds at a temperature of 50 to 160° C.

Meanwhile, the application amount per unit area of the rubber coating layer may be 75 to 300 g/m$^2$, and the application amount per unit area of the rubber coating layer to the adhesive layer can be adjusted in the above range, thereby manufacturing a tire cord having excellent adhesiveness to rubber and having excellent durability while being thin in thickness. The specific application amount is as mentioned above.

Meanwhile, the rubber coating layer may have a thickness of 0.01 to 0.20 mm, or 0.02 to 0.20 mm, or 0.04 to 0.10 mm. When the thickness of the rubber coating layer is less than 0.01 mm, the rubber coating layer does not have sufficient tackiness and adhesive force, and so tire manufacturing characteristics are degraded, and further, tire defects may occur. Further, when the thickness of the rubber coating layer exceeds 0.20 mm, the thickness of the tire cord may be increased, resulting in an increase in the thickness of the tire.

Meanwhile, after the formation of the rubber coating layer, a slitting step may be optionally performed.

The method may further include a step of cutting the tire cord made in a plate shape so as to meet the purpose of use or as necessary. This cutting is called slitting. The slitting step may be omitted. The method of cutting or slitting is not particularly limited.

For example, the slitting may be performed by cutting the tire cord using a conventional cutter knife or heating knife.

Meanwhile, the tire cord manufactured through the manufacturing method may be wound around a winder.

In yet another embodiment, the present invention relates to a tire.

More specifically, according to yet another embodiment of the invention, there can be provided a tire comprising the above-mentioned tire cord.

The tire cord may be applied to at least one of a cap ply, a belt and a carcass of the tire. The tire cord has excellent adhesion to rubber and can be easily adhered to the rubber without going through the rolling process.

When the tire cord is used as cap ply, the rolling process can be omitted and thus, the manufacturing process of the tire can be simplified and the tackiness of the cap ply is greatly increased. Thus, at the time of manufacturing a green tire, the air pocket is reduced and so the defective rate of the tire can reduced. In addition, since the rolling process is not performed, a thin and light tire can be manufactured.

Advantageous Effects

According to the present invention, a tire cord having excellent durability while being thin in thickness can be provided.

Also, according to the present invention, a manufacturing method of a tire cord having excellent durability while being thin in thickness can be provided.

Further, according to the present invention, a tire comprising the tire cord can be provided.

DETAILED DESCRIPTION OF THE EMBODIMENTS

Hereinafter, the present invention will be described in more detail by way of the following examples. However, these examples are presented for illustrative purposes only and the scope of the present invention is not limited thereby.

Example and Comparative Example

Example 1

A twist of 200 TPM was imparted to a nylon having a total fineness of 630 de, and a fiber substrate (thickness: about 0.40 mm) having the number of warp yarns (n/inch) of 58 and a warp density of 90% was woven. At this time, the number of weft yarns (n/inch) was 8, and the weft density was 4.8%.

Next, the fiber substrate was dipped in an adhesive coating solution containing 15 wt. % of resorcinol-formaldehyde-latex (RFL) and 85 wt. % of a solvent (water, $H_2O$), and then heat-treated at 150° C. for 100 seconds to form an adhesive layer.

Next, the rubber coating layer was applied onto the adhesive layer at an application amount per unit area of 120~130 g/m² using a comma coater, and the solvent is volatilized at a temperature of 70° C. Thereby, a tire cord in which a rubber coating layer having a thickness of 0.04~0.05 mm was formed was manufactured.

At this time, the rubber coating layer was formed by applying a rubber coating solution to the adhesive layer, and an elastomeric polymer composition containing 20~50 parts by weight of carbon black, 5~10 parts by weight of para-oil, 2~8 parts by weight of zinc oxide, 2~8 parts by weight of stearic acid, 1~5 parts by weight of anti-aging agent (RUBBER ANTIOXIDANTS, BHT), 2~8 parts by weight of sulfur and 1-3 parts by weight of vulcanization accelerator (ZnBX) based on 100 parts by weight of styrene butadiene rubber (SBR) and natural rubber was dispersed in a solvent of 100 parts by weight of toluene at a concentration of 20~40% to prepare a rubber coating solution.

Example 2

A twist of 150 TPM was imparted to a nylon having a total fineness of 1260 de, and a fiber substrate having the number of warp yarns (n/inch) of 42 and a warp density of 84% was woven.

Next, the fiber substrate was dipped in an adhesive coating solution containing 15 wt. % of resorcinol-formaldehyde-latex (RFL) and 85 wt. % of a solvent (water, $H_2O$), and then heat-treated at 150° C. for 100 seconds to form an adhesive layer.

Next, the rubber coating layer was applied onto the adhesive layer at an application amount per unit area of 130~140 g/m² using a comma coater, and the solvent is volatilized at a temperature of 70° C. Thereby, a tire cord in which a rubber coating layer having a thickness of 0.06~0.07 mm was formed was manufactured.

At this time, the same rubber coating solution as in Example 1 was used for the rubber coating layer, and a tire cord was manufacture in the same manner as in Example 1.

Example 3

A twist of 150 TPM was imparted to a PET having a total fineness of 800 de, and a fiber substrate having the number of warp yarns (n/inch) of 50 and a warp density of 71% was woven.

Next, the fiber substrate was dipped in an adhesive coating solution containing 15 wt. % of resorcinol-formaldehyde-latex (RFL) and 85 wt. % of a solvent (water, $H_2O$), and then heat-treated at 150° C. for 100 seconds to form an adhesive layer.

Next, the rubber coating layer was applied onto the adhesive layer at an application amount per unit area of 150~160 g/m² using a comma coater, and the solvent is volatilized at a temperature of 70° C. Thereby, a tire cord in which a rubber coating layer having a thickness of 0.07~0.08 mm was formed was manufactured.

At this time, the same rubber coating solution as in Example 1 was used for the rubber coating layer, and a tire cord was manufacture in the same manner as in Example 1.

Comparative Example 1

A tire cord and a tire were manufactured in the same manner as in Example 1, except that a twist of 200 TPM was imparted to a nylon having a total fineness of 630 de, and a fiber substrate having the number of warp yarns (n/inch) of 34 and a warp density of 53% was used.

Comparative Example 2

A tire cord and a tire were manufactured in the same manner as in Example 1, except that a twist of 150 TPM was imparted to a nylon having a total fineness of 1260 de, and a fiber substrate having the number of warp yarns (n/inch) of 30 and a warp density of 60% was used.

Comparative Example 3

A tire cord and a tire were manufactured in the same manner as in Example 1, except that a twist of 150 TPM was imparted to a PET having a total fineness of 800 de, and a fiber substrate having the number of warp yarns (n/inch) of 34 and a warp density of 47% was used.

Comparative Example 4

A tire cord was manufactured in the same manner as in Example 1, except that the rubber coating layer was applied onto the adhesive layer at an application amount per unit area of 45~50 g/m² using a comma coater, and the solvent is volatilized at a temperature of 70° C. to form a rubber coating layer having a thickness of 0.010.02 mm.

Comparative Example 5

A tire cord was manufactured in the same manner as in Example 2, except that the rubber coating layer was applied onto the adhesive layer at an application amount per unit area of 65~70 g/m² using a comma coater, and the solvent is volatilized at a temperature of 70° C. to form a rubber coating layer having a thickness of 0.02 mm.

Comparative Example 6

A tire cord was manufactured in the same manner as in Example 3, except that the rubber coating layer was applied onto the adhesive layer at an application amount per unit area of 65~70 g/m² using a comma coater, and the solvent is volatilized at a temperature of 70° C. to form a rubber coating layer having a thickness of 0.02 mm.

Experimental Example

Experimental Example 1: Measurement of Breaking Tenacity and Elongation at Break The strength at break and the elongation at break of the tire cord were respectively measured according to the test method of ASTM D885 by applying a tensile velocity of 300 m/min to 10 samples of 250 mm (width 10 mm×length 250 mm) using an Instron Tester (Instron Engineering Corp., Canton, Mass.).

Then, the strength at break was divided by the total fineness of the tire cord to obtain the breaking tenacity (g/d) of each sample. Then, the breaking tenacity and the elongation at break of a tire cord having a rubber coating layer were obtained by calculating the averages of the strength at break and the elongation at break of the 10 samples. In addition, elongation at 4.5 kgf load and 6.8 kgf load were measured respectively.

TABLE 1

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Number of warp yarns per unit area (n/inch) | 58 | 42 | 50 | 34 | 30 | 34 | 58 | 42 | 50 |
| Warp density (%) | 90 | 84 | 71 | 53 | 60 | 47 | 90 | 84 | 71 |
| Application amount of coating layer (g/m$^2$) | 120~130 | 130~140 | 150~160 | 120~130 | 120~130 | 120~130 | 45~50 | 65~70 | 65~70 |
| Strength (10 mm, kgf) | 144.77 | 209.14 | 165.66 | 82.41 | 144.28 | 110.75 | 138.47 | 198.21 | 162.34 |
| Breaking tenacity (g/d) | 10.0 | 9.2 | 8.6 | 8.6 | 8.9 | 8.5 | 8.6 | 8.9 | 8.5 |
| Elongation at break (%) | 23.55 | 22.6 | 10.7 | 12.5 | 14.2 | 8.9 | 22.95 | 21.2 | 9.9 |
| Elongation at 4.5 kgf (%) | 0.67 | 0.62 | 0.39 | 0.86 | 0.73 | 0.46 | 0.62 | 0.57 | 0.34 |
| Elongation at 6.8 kgf (%) | 0.96 | 0.85 | 0.49 | 1.24 | 0.91 | 0.58 | 0.88 | 0.80 | 0.42 |

According to Table 1, it can be confirmed that when the tire cords according to Examples of the present invention were used, they exhibited superior characteristics in terms of strength, breaking tenacity and elongation at break as compared with Comparative Examples.

Experimental Example 2: Measurement of Adhesive Strength

The adhesive peel strength of the tire cords prepared in Examples and Comparative Examples on the carcass layer of the tire were measured according to the test method of ASTM D4393.

Specifically, 0.6 mm thick rubber sheet, cord fabric, 0.6 mm thick rubber sheet, cord fabric, and 0.6 mm thick rubber sheet were sequentially laminated to prepare a sample, which was then vulcanized at 170° C. under a pressure of 60 kg/cm$^2$ for 15 minutes. Next, the vulcanized sample was cut to prepare a specimen having a width of 1 inch. The sample thus prepared was subjected to a peel test at a rate of 125 mm/min at 25° C. using a universal testing machine (Instron Co., Ltd.), and then the adhesive strength of the tire cord on the carcass layer was measured. At this time, the average value of the load generated at the time of peeling was calculated by an adhesive strength.

According to Table 2, it can be confirmed that when the tire cords according to Examples of the present invention were used, they had excellent adhesion to rubber as compared with the tire cord of Comparative Examples.

The invention claimed is:
1. A tire cord comprising:
   a fiber substrate that is woven with a density between warp yarns of 90% or more, and a number of warp yarns per unit length (n/inch) of 58 or more using a warp yarn containing at least one of nylon, rayon, aramid, and polyester including PET;
   an adhesive layer formed on the fiber substrate; and
   a rubber coating layer formed on the adhesive layer,
   wherein the rubber coating layer comprises synthetic rubber or natural rubber,
   wherein the warp yarns have fineness of 300 to 630 de, and
   wherein the application amount per unit area of the rubber coating layer to the adhesive layer is 75 to 300 g/m$^2$.
2. The tire cord according to claim 1, wherein:
   the fiber substrate has a thickness of 0.10 to 0.60 mm.
3. The tire cord according to claim 1, wherein:
   the rubber coating layer has a thickness of 0.01 to 0.20 mm.
4. The tire cord according to claim 1, wherein:
   the adhesive layer comprises resorcinol-formaldehyde-latex (RFL).
5. The tire cord according to claim 1, wherein:
   the tire cord has a breaking tenacity of 10 to 15.0 g/d as measured according to the standard test method of ASTM D885.

TABLE 2

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Adhesive strength (kgf) | 18.2 | 17.2 | 22.6 | 13.4 | 14.8 | 16.1 | 10.1 | 9.7 | 12.6 |

6. The tire cord according to claim 1, wherein:
the tire cord has an elongation at break of 23.55 to 30% as measured according to the standard test method of ASTM D885.

7. The tire cord according to claim 1, wherein:
the tire cord has an adhesive strength of 18.2 kgf or more when evaluating the adhesive strength according to the standard test method of ASTM D4393.

8. A method for manufacturing a tire cord, comprising the steps of:
preparing a fiber substrate that is woven with a density between warp yarns of 90% or more, and a number of warp yarns per unit length (n/inch) of 58 or more using a warp yarn containing at least one of nylon, rayon, aramid, and polyester including PET;
forming an adhesive layer on the fiber substrate; and
applying a rubber coating solution onto the adhesive layer and performing a heat treatment to form a rubber coating layer,
wherein the rubber coating layer comprises synthetic rubber or natural rubber,
wherein the warp yarns have fineness of 300 to 630 de, and
wherein the application amount per unit area of the rubber coating layer to the adhesive layer is 75 to 300 g/m$^2$.

9. The method for manufacturing a tire cord according to claim 8, wherein:
the fiber substrate has a thickness of 0.10 to 0.60 mm.

10. The method for manufacturing a tire cord according to claim 8, wherein:
the rubber coating layer has a thickness of 0.01 to 0.20 mm.

11. The method for manufacturing a tire cord according to claim 8, wherein:
the rubber coating solution comprises 10 to 30% by weight of an elastomeric polymer composition containing synthetic rubber or natural rubber; and 70 to 90% by weight of a solvent.

12. The method for manufacturing a tire cord according to claim 8, wherein:
the adhesive layer comprises resorcinol-formaldehyde-latex (RFL).

13. The method for manufacturing a tire cord according to claim 8, which further comprises a step of imparting twist to a warp yarn containing at least one of nylon, rayon, aramid, and polyester including PET.

14. A tire comprising the tire cord according to claim 1.

* * * * *